United States Patent
Shaaban et al.

(10) Patent No.: US 11,332,032 B2
(45) Date of Patent: *May 17, 2022

(54) SYSTEM AND METHOD FOR CHARGING ELECTRIC VEHICLES AT SMART PARKING LOTS

(71) Applicant: King Abdulaziz University, Jeddah (SA)

(72) Inventors: Mostafa Shaaban, Jeddah (SA); Hatem Faiz Sindi, Jeddah (SA)

(73) Assignee: King Abdulaziz University, Jeddah (SA)

(*) Notice: Subject to any disclaimer, the term of this patent is extended or adjusted under 35 U.S.C. 154(b) by 208 days.

This patent is subject to a terminal disclaimer.

(21) Appl. No.: 16/827,041

(22) Filed: Mar. 23, 2020

(65) Prior Publication Data

US 2021/0291694 A1    Sep. 23, 2021

(51) Int. Cl.
*B60L 53/67*    (2019.01)
*B60L 53/62*    (2019.01)
(Continued)

(52) U.S. Cl.
CPC .............. *B60L 53/67* (2019.02); *B60L 53/16* (2019.02); *B60L 53/31* (2019.02); *B60L 53/62* (2019.02);
(Continued)

(58) Field of Classification Search
CPC ................................. B60L 53/16; B60L 53/18
See application file for complete search history.

(56) References Cited

U.S. PATENT DOCUMENTS

| | | | |
|---|---|---|---|
| 2012/0088382 A1* | 4/2012 | Konchan | B60L 53/16 439/153 |
| 2013/0154561 A1 | 6/2013 | Gadh et al. | |

(Continued)

FOREIGN PATENT DOCUMENTS

| | | |
|---|---|---|
| CN | 108510128 A | 9/2018 |
| WO | 2018/098400 A1 | 5/2018 |
| WO | 2019/126806 A1 | 6/2019 |

OTHER PUBLICATIONS

Arias, et al. ; Electric vehicle charging demand forecasting model based on big data technologies ; Applied Energy 183 ; pp. 327-339 ; Aug. 14, 2016 ; 13 Pages.
(Continued)

*Primary Examiner* — David V Henze-Gongola
(74) *Attorney, Agent, or Firm* — Oblon, McClelland, Maier & Neustadt, L.L.P.

(57) ABSTRACT

A smart parking lot system for charging electric vehicles (EVs) includes a charger unit, a switching unit, an interface unit, and a control unit. The charger unit includes m chargers, the switching unit includes matrix switch elements S(i,j) configured to switch a connection between an i-th input port and a j-th output port according to a control signal specifying an address (i,j) and a switching state. An interface unit includes n interface ports to be connected with EVs parked for charging. Each of the m chargers is connected with one of m input ports of the matrix switch, respectively. Each of the n interface ports is connected with one of n output ports of the matrix switch, respectively. The control unit is configured to provide for the EV connected with an interface port, accessibilities to at least two chargers with different output power levels, when available.

13 Claims, 10 Drawing Sheets

(51) Int. Cl.
*B60L 53/63* (2019.01)
*B60L 53/66* (2019.01)
*B60L 53/31* (2019.01)
*B60L 53/16* (2019.01)
*B60L 53/64* (2019.01)

(52) U.S. Cl.
CPC .............. *B60L 53/63* (2019.02); *B60L 53/64* (2019.02); *B60L 53/66* (2019.02); *B60L 2240/72* (2013.01)

(56) References Cited

U.S. PATENT DOCUMENTS

2016/0101704 A1* 4/2016 McCalmont ............ B60L 53/00
320/101
2020/0215929 A1* 7/2020 Javaid ................ G06Q 20/3278

OTHER PUBLICATIONS

Saldana, et al. ; Electric Vehicle into the Grid: Charging Methodologies Aimed at Providing Ancillary Services Considering Battery Degradation ; MDPI Energies 12 ; Jun. 25, 2019 ; 37 Pages.

* cited by examiner

SYSTEM AND METHOD FOR CHARGING ELECTRIC VEHICLES AT SMART PARKING LOTS

BACKGROUND

Technical Field

The present disclosure relates to charging systems for plug-in Electric Vehicles.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Promoting electric vehicles (EVs) has become one of the primary strategic goals for many governments due to energy resource security and environmental concerns related to emmissions such as greenhouse gases and other polutants. Deployment of EVs has been growing rapidly over the past ten years, with the global stock of electric passenger cars passing 5 million in 2018, an increase of 63% from the previous year, and about 250% during the preceding five years since 2013. The targets of some countries are listed in Table 1. Consequently, worldwide EV sales are expected to include over 6 million vehicles by 2020, which would account for 7% of total new vehicle sales. *U.S. Energy Information Administration* (EIA), https://www.eia.gov., Trigg T, Telleen P., Global EV outlook "Understanding the electric vehicle landscape to 2020," France, Paris: *OECD/IEA;* 2013, https://www.iea.org/publications/globalevoutlook_2013.pdf, D. Hurst, J. Gartner, "Executive Summary: Electric Vehicle Market Forecasts Global Forecasts for Light Duty Hybrid, Plug-in Hybrid, and Battery Electric Vehicles: 2013-2020*", Navigant Research,* 2013. In a longer range, some countries have created a deployment target of up to 7.9 million EVs by 2030, forecasting a world wide EV stock of 250 million by 2030, with a total world wide annual sales of 43 million EV units in 2030 which would account for a market share of 30% of the total annual sales of vehicles. International Energy Agency, "Global EV Outlook 2019," https://www.iea.org/reports/global-ev-outlook-2019.

TABLE 1

Announced national PEV deployment targets

| Country | Target (EV units) | Year |
|---|---|---|
| Canada | 500,000 | 2018 |
| Denmark | 200,000 | 2020 |
| France | 2,000,000 | 2020 |
| Ireland | 230,000 | 2020 |
| Spain | 2,500,000 | 2020 |
| Sweden | 600,000 | 2020 |
| United Kingdom | 7,900,000 | 2030 |
| USA | 3,300,000 | 2025 |
| Dubai | 50% of the total taxi fleet | 2021 |

Large penetration of EVs may improve the sustainability of transportation but could also introduce various problems. An inevitable issue would be the increase in electricity demand for charging the EV batteries: a single EV can increase household electricity consumption by 50%. Several studies have pointed out the impact of charging EVs on distribution systems. Brouwer A S, Kuramochi T, van den Broek M, Faaij A, "Fulfilling the electricity demand of electric vehicles in the long term future: an evaluation of centralized and decentralized power supply systems," *Appl Energy* 2013; 107:33-51, http://dx.doi.org/10.1016/j.apenergy, 2013.02.005, Salah F, Ilg J, Flath C, Basse H, van Dinther C., "Impact of electric vehicles on distribution substations: a Swiss case study," *Appl Energy,* 2015; 137: 88-96, http://dx.doi.org/10.1016/j.apenergy, 2014.09.091.

The number of charging points world wide was estimated at approximately 5.2 million at the end of 2018, up 44% from the previous year. Most of this increase was in private charging points, accounting for more than 90% of the 1.6 million installations in 2018. International Energy Agency "Global EV Outlook 2019", https://www.iea.org/reports/global-ev-outlook-2019.

FIG. 1 illustrates a smart EV charging infrastructure including an EV charging system with a single input and multiple outputs. Chynoweth, J., Chung, C. Y., Qiu, C., Chu, C. C. P., & Gadh, R., "Smart electric vehicle charging infrastructure overview," in *ISGT*, pp. 1-5, February, 2014, US 2013/0049677 A1. Managing multiple chargers in a parking lot has been proposed in several publications and some are available in the market as commercial products. FIG. 2 illustrates multiple output EV chargers available in the market: General Electric and AeroVironment offer double, triple, and Quad Pedestal 30-Amp Level 2 EV charging stations. FIG. 3 illustrates a reported concept of controlling the EV charging management in parking lots via a central controller. Maël Cazals and Gilles Vidalenche, White Paper, March 2011. A wide-scale management system applicable to multiple EV chargers has also been proposed based on EV chargers with single input and single output. US 2013/0024306 A1.

Modifications in the hardware of the EV chargers have been proposed so that chargers can operate with input from the grid at 120 V or 240 V. The modifications enable the EV chargers to be used in different countries and at different voltage levels from the grid perspective. U.S. Pat. No. 8,929,069 B2.

An EV charging architecture for parking lots has been proposed that focuses on building a massive single-input multiple-output charger in a parking lot instead of installing several commercial chargers. It was assumed that the massive charger would be assembled from scratch and would use hardware ratings same as those of single input single output standard charging systems. U.S. Pat. No. 5,803,215.

An intelligent EV charging system with the following capabilities has been proposed: i) Schedule EV charging to optimal periods to maximize the benefits for grid operators and EV owners; ii) EV charger communicates with both a master controller as well as an EV plugged at that charger; iii) Manage multiple EV chargers in a parking lot; iv) Discharge the batteries of EV to the grid under demand response programs; v) Manage the EV charging according to EV aggregators, which buy energy from EV owners and sell it to the grid; and vi) Transmit and receive information from each individual vehicle, where the information includes the location of charging stations and cost of charging per kWh. US 2014/0203077 A1. The proposed system covers many aspects of future EV charging management systems. However, it focuses on charge management rather than charging hardware architecture, thus utilized single input single output EV chargers.

Optimizing charging rate according to energy prices and battery pack requirements was proposed for the EV charging system. US 2015/0137768 A1. Moving a charging connector by a robot mechanism to engage the charging port of the electric vehicle has been proposed. U.S. Pat. No. 8,853,999.

SUMMARY

In an exemplary embodiment, a smart parking lot system for charging electric vehicles (EVs) includes a charger unit, a switching unit, an interface unit, and a control unit. The charger unit includes m chargers, the switching unit includes matrix switch elements $S_P(i,j)$ configured to switch a connection between an i-th input port and a j-th output port according to a control signal specifying an address (i,j) and a switching state. An interface unit includes n interface ports to be connected with EVs parked for charging. Each of the m chargers is connected with one of m input ports of the matrix switch, respectively. Each of the n interface ports is connected with one of n output ports of the matrix switch, respectively. The control unit is configured to provide for the EV connected with an interface port, accessibilities to at least two chargers, where the two chargers may be with different output power levels, when available. The control unit is configured to control according to the system constraints, where the system constraints include the controller controls the operations within a power limit of the grid power, the controller adopts an EV charging process according to a set of models for the EV charging process, and the controller estimates a best utilizing function for present and other possible configurations of the assignments of the plurality number of m chargers to some of the plurality number of n interface ports, at present or in near future, and decides a next step configuration to be adopted and a timing to modify the configuration. The best utilizing function is defined by a weighted sum of evaluation factors, the evaluation factors includes an operation efficiency of the chargers, a total profit from the system, and a customer satisfaction factor including a ratio of the delivered energy and the required energy, wherein weighting coefficients are configured to be specified by an operator.

In another exemplary embodiment, a method for designing a smart parking lot system for charging EVs incudes collecting historical data on vehicle arrivals and demands; clustering the historical vehicle arrival data; fitting distributions for clustered historical data; generating virtual scenarios for future vehicle arrival rates and the durations; collecting historical data on energy prices and ambient temperatures; optimizing specifications on the smart parking lot system for best utilization within a given constraint, where the best utilization may be estimated with a best utilizing function defined by a weighted sum of evaluation factors, the evaluation factors includes an operation efficiency of the chargers, a total profit from the system, and a customer satisfaction factor including a ratio of the delivered energy and the required energy, where weighting coefficients are specified by an operator, and the specifications on the smart parking lot system include the plurality number of chargers m, power levels (ratings) for each of the chargers, and the plurality number of the interface ports n, where the smart parking lot system for charging EVs includes a charger unit including a plurality number of m chargers, a switching unit comprising a matrix switch S with the plurality number of m input ports, and a plurality number of n output ports, an interface unit comprising a plurality number of n interface ports, and a control unit. The switching unit is configured to provide for one of the plurality number of n interface ports accessibilities to at least two chargers, and the controller is configured to provide for the EV connected with the one of the plurality number of n interface ports accessibilities to the at least two chargers when available.

In another exemplary embodiment, a method for operating a smart parking lot system for charging EVs includes accepting a customer and an EV, transferring a collected information to the memory; forecasting charging demands over a predetermined time window after the arriving time of the EV, coordinating a selection of charging classes, monitoring operation statuses, estimating the best utilizing function for a present configuration and for near future possible configurations of assignments of the plurality number of m chargers to some of the plurality number of n interface ports, and modifying the configuration of the assignments to maximize the best utilizing function.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
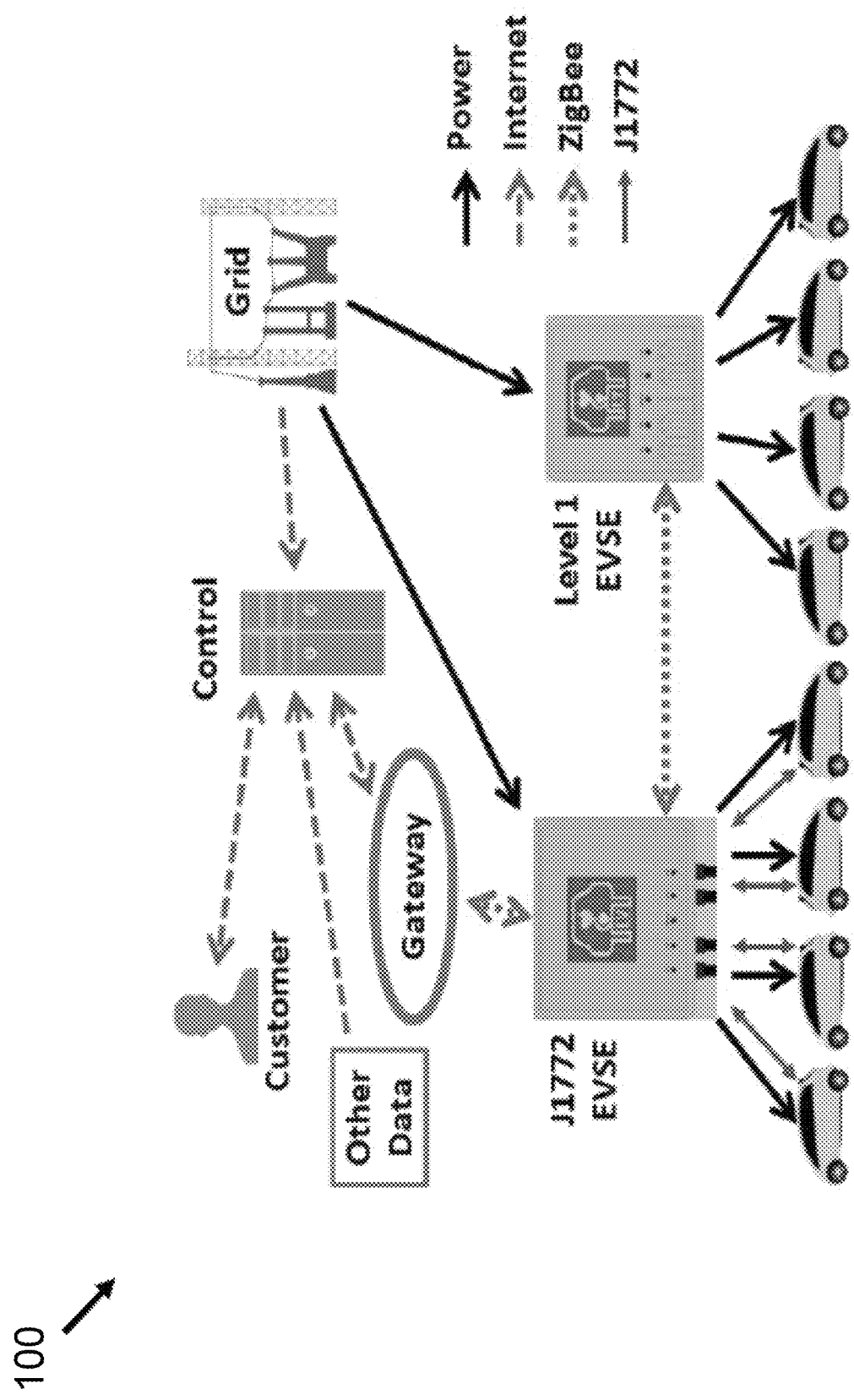
FIG. 1 illustrates a reported smart EV charging infrastructure including an EV charging system with a single input and multiple outputs.
Figure 2:
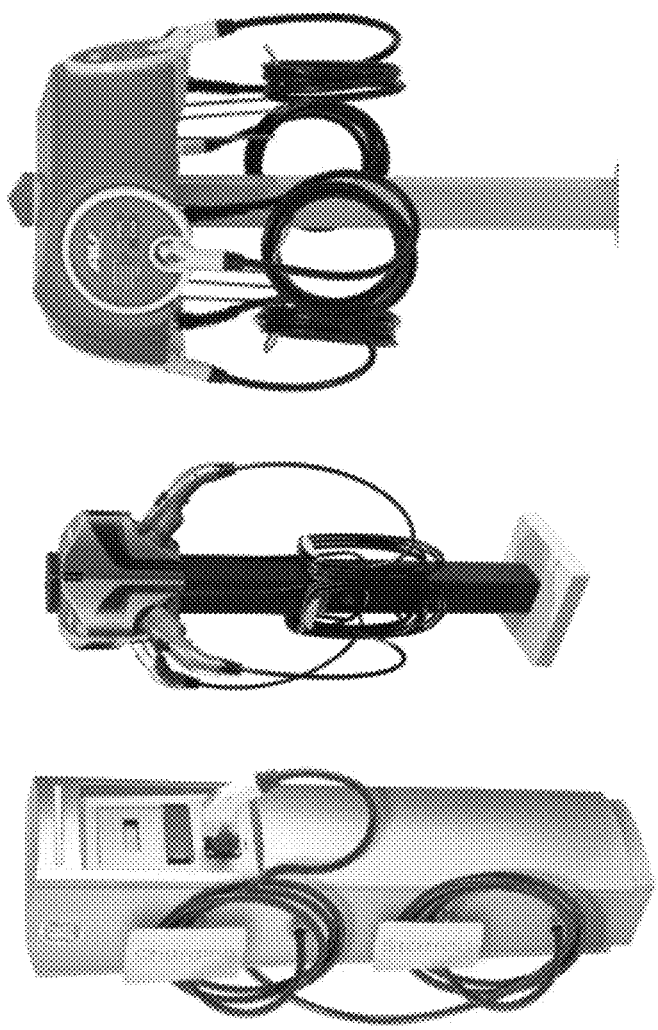
FIG. 2 illustrates multiple outputs EV chargers available in the market.
Figure 3:
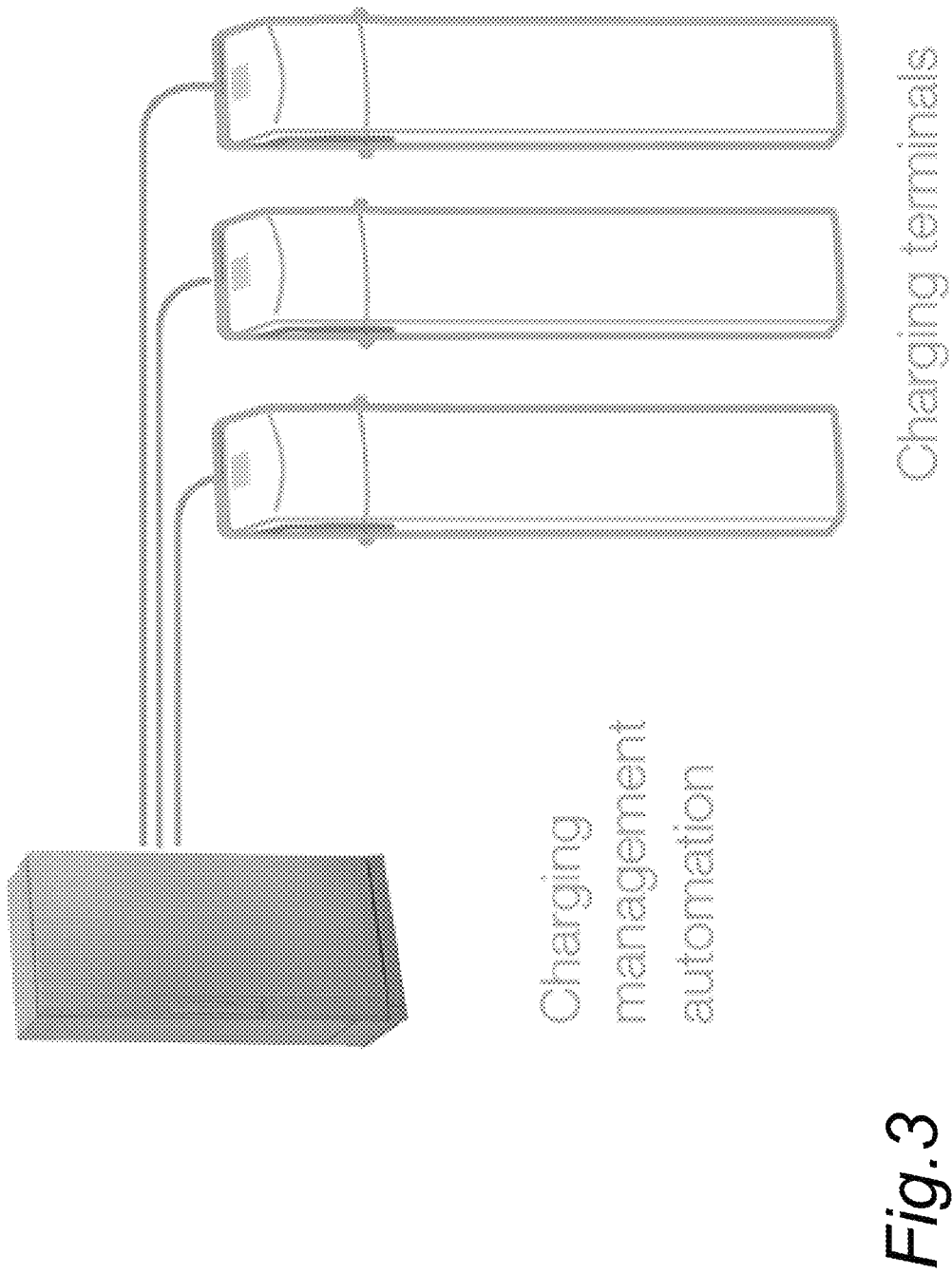
FIG. 3 illustrates a reported concept of controlling EV charging in parking lots via a central controller.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of the present disclosure are directed to a charging system installed in a smart parking lot for plug-in EVs. A smart parking lot is a parking lot with EV chargers and has the capability of optimally distributing the required charging energy, i.e., shifting the required charging energy to optimal periods during the parking duration of an EV to avoid overload problems in the power grid and to maximize operation efficiency of the EV chargers and throughput of EVs with charging demands.

EV parking lots so far have adopted EV chargers with single input and multiple outputs. They are insufficient in maximizing the operational efficiency of the chargers and throughput of EV charging demands, as described below.

Assume a parking lot with an electrical supply line capacity of maximum 200 kW where 50 kW chargers are required to be installed. A set of four 50 KW chargers can be installed at maximum in this parking lot. If more chargers are installed, some of the chargers have to be deactivated at specific periods to avoid thermally overloading the supply line. This results in reduced operation efficiency of the chargers, which is not economically viable. As apparent here, the number of chargers in a parking lot is restricted by two factors: 1) a grid capacity, i.e., a supply line capacity, and 2) a cost of purchasing and installing the chargers, assuming the space for the parking lots is not a limiting factor.

When the EV chargers are single input and single output type, the four charger system described above may not be a practical solution from a throughput point of view. This is because some of the EVs will not leave after completion of charging and may stay longer in the parking lot, which results in reduced operation efficiency of the installed chargers. Installing single input and multiple output chargers may solve this situation when redundant outputs and parking spaces are available at a charger where the EVs remain parked after completion of charging. However, mere aggregation of single input and multiple output chargers cannot solve the following situation, for example.

Currently, EV chargers are available with various power ratings, such as 3.5, 7, 50, and 100 kW. A mixed installation of chargers with various ratings corresponding to customer demands would be a reasonable solution from the point of view of line capacity and cost efficiency. Under such system, for example, assume two charging ports are available, for 7 KW at parking lot A and for 50 KW at parking lot B, and two parking spaces available at the parking lot A for 7 KW charging capacity only. There, an EV with charging demand for 7 KW can readily be connected and start charging, while an EV with charging demand for 50 KW will have to wait until parking lot B for 50 KW becomes available, even if the charger with 50 KW was available, because the 50 KW outputs are delivered only at the parking lot B. This limitation reduces both the operation efficiency of 50 KW charger and the throughput of the EV charging demand.

A smart EV charging system including an EV charging matrix switcher (EVCM) according to an embodiment of present disclosure can solve the above problem by reconfiguring the supply of the 50 KW output from the parking lot B to the parking lot A, and therefore can maintain maximum operation efficiency of the 50 KW chargers and charging throughput of EVs. The EVCM according to embodiments is configured to accept multiple inputs from a plurality (m) of chargers according to the grid (supply line) capacity and to distribute each of a plurality (m) of outputs from the chargers to one of a plurality (n) of interface ports, respectively, where each of the plurality of n interface ports is installed at one of a plurality (n) of parking slots, and where distribution of the plurality of n outputs are reconfigurable, namely can be rearranged time to time in order to realize maximize operation efficiency of the chargers and throughput of EVs.

Figure 4:
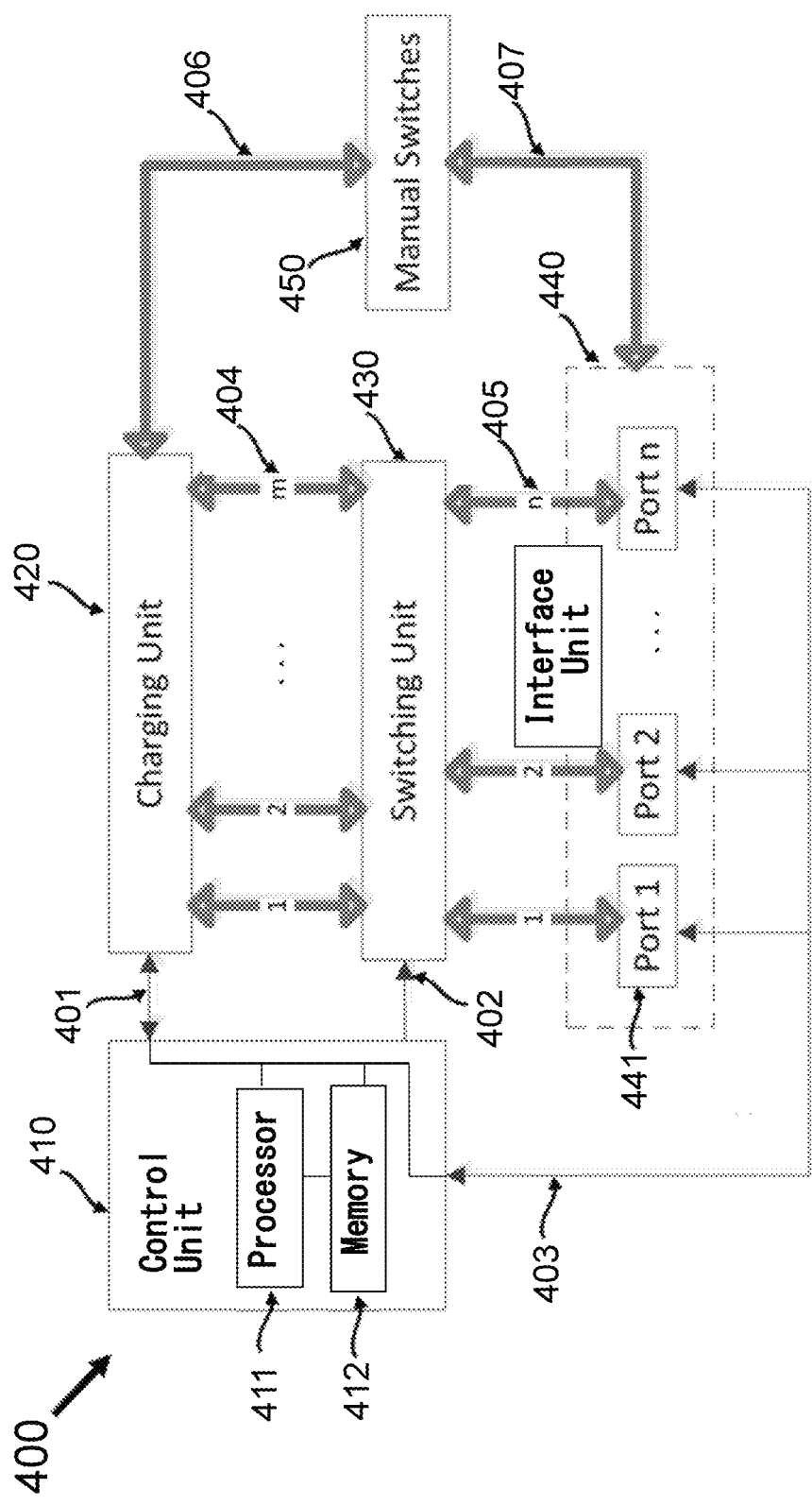
FIG. 4 is an exemplary block diagram of a smart EV charging system with an electric vehicle charging matrix switcher (EVCM) according to certain embodiments of the present disclosure.

FIG. 4 is an exemplary block diagram of a smart EV charging system with the electric vehicle charging matrix switcher (EVCM) according to certain embodiments of the present disclosure. The smart EV charging system 400 with the EVCM according to certain embodiment includes: a control unit 410; a charger unit 420, a switching unit 430, an interface unit 440, and manual switching unit 450. The control unit 410 includes a processor 411 and a memory device 412, and a human interface not illustrated in FIG. 4. The charger unit 420 includes a plurality of m chargers which may be of different output power ratings and standards. The switching unit 430 includes a matrix switch or a cross connect switch configured to connect any of the plurality of m chargers in the charger unit 420 to any of a plurality of n interface ports in the interface unit 440. Each of the plurality of n interface ports in the interface unit 440 is located in one of the parking slots and includes a smart panel as a human interface and EV charger outlets to be attached to an EV parked for charging. The EV charger outlets are configured to conform to standard(s) to be adaptable to various EVs. Each of the outputs from the plurality of m chargers in the charger unit 420 is connected with one of the plurality of m input ports of the switching unit 430, respectively by the plurality of m connections 404, while the switching unit 430 and the interface unit 440 are connected by a plurality of n connections 405, one by one as well. The manual switching unit 450 installed for use in case of a failure of the control unit, includes manual switches and is connected with the charger unit 420 and the interface unit 440.

The control unit 410 is configured to control the charger unit 420, the switching unit 430, and the interface unit 440 by sending control signals to those other units. The control unit 410 is configured to receive information from other units and to store them as collected data in the memory device 412. The processor 411 is configured to process the collected data and to generate the control signals to be sent to the other units by the controller. The memory 412 is configured to install system operation programs, a database and system constraints.

Communications 401 between the control unit 410 and the charger unit 420 include a) an information sent from the charger unit 420 to the control unit 410 and b) a control signal sent from the control unit 410 to the charger unit 420. The information a) sent from the charger unit 420 to the control unit 410 includes a charging status and a state of charge (SOC) of a battery of an EV connected for charging. The control signal b) sent to the charger unit 420 includes an enabling signal or a disabling signal and/or a duty cycle to limit the maximum output power for one of the plurality number of m chargers. Alternatively, the charging status and a state of charge (SOC) of the battery of the EV connected for charging can be monitored by a monitor installed in the interface ports and be transferred to the control unit, either by a wired line or wireless transmission. Then the charging status and a state of charge (SOC) of the battery of the EV can be included in the information b).

Control signals c) 402 sent from the control unit 410 to the switching unit 430, decide and reconfigure a switching status of power electronics switches or mechanical switches in the switching unit 430. Namely, the switching unit 430 operates as the EVCM when operated by the control signal c) 402 according to certain embodiments.

Data exchanges 403 between the control unit 410 and the interface unit 440 include, d) a user input from the interface unit 440 to the control unit 410, and e) a request of information from the control unit to a user at the interface unit 440. Additionally, the charging status and a state of charge (SOC) of the battery of the EV connected for charging may be sent from the monitor installed in the interface unit 440 to the control unit 410. The smart panel or a touch screen can be used as the human interface in the interface unit 440 to perform this task.

The communications 401, the control signals 402 and the data exchanges 403 may be by a wired transmission or by a wireless transmission.

Each of the plurality of m connections 404 between the charger unit 420 and the switching unit 430 is configured to transfer at least an electric power for charging EVs, and may further be configured to transfer information on the charging status and the state of charge (SOC) of the battery of an EV connected for charging at the interface unit, and a mechanical safety signal from a mechanical shutter for safety at the interface unit. The purpose of the mechanical shutter is to prevent from applying voltages to the power connection unless a charging cord has been completely plugged in the EV. Alternatively, the information on the charging status and the state of charge (SOC) of the battery and the mechanical safety signal from the mechanical shutter may be transferred to the charger unit via bypassing the control unit 410 as a part of the data exchange 403 and the communications 401, without passing the switching unit. This alternative routing is feasible, because the control unit has a complete set of information on connections between the plurality number of m chargers and the plurality number of n interface ports of the interface unit as part of the control signal of the matrix switch. Adopting both routes of transmissions is also possible for securer processing.

Each of the plurality of n connections between the switching unit 430 and the interface unit 440 is configured to transfer an electric power from each of output ports of the switching unit 420 to each of the plurality of n interface ports of the interface unit 440.

The manual unit 450 is configured to control the charger unit 420 and the interface unit 440 manually in case of a failure of the control unit 410. The manual control unit 450 is further configured to activate a plurality of k chargers and corresponding k interface ports of the interface unit 440, respectively where k is not larger than m. In such situation, remaining (m−k) chargers and (n−k) interface ports are out of service.

The charger unit 420 is designed according to grid power capacity and configured to maximize a best utilizing function defined by a weighted sum of evaluation factors. The evaluation factor includes an operational efficiency of the chargers; a total profit from the system; and a customer satisfaction factor including a ratio of the delivered energy and the required energy, wherein weighting coefficients are configured to be specified by an operator. In estimating the evaluation factors, historical data on arrival rates and demands are collected and analyzed as detailed in FIG. 7.

The plurality of chargers m, and their power ratings, the plurality of n interface ports in the interface unit are adjusted based on market demands, namely, customer access details, in addition to the grid power capacity. The access details controls determining how the interface unit be configured accessible to the chargers. For example, in a full (100%) access, all the interface ports are configured accessible to all the chargers. This represents the maximum case from the size and the cost of the switching unit, as the number of required switches is n×m. In a half (50%) access, each of the interface ports can access half the chargers only. It is preferred in this case that interface ports can access high power (level 3, or DC Fast charge) chargers and low power (level 2) chargers; thus, allowing a variety of options for the EV owners to charge their vehicles depending on the required period of charging. Types of chargers presently available and various types of receptacles have been reported. National Labs. "Vehicle Charging," https://www.energy.gov/eere/electricvehicles/vehicle-charging, the entire contents of which is herein incorporated by reference.

Figure 5A:
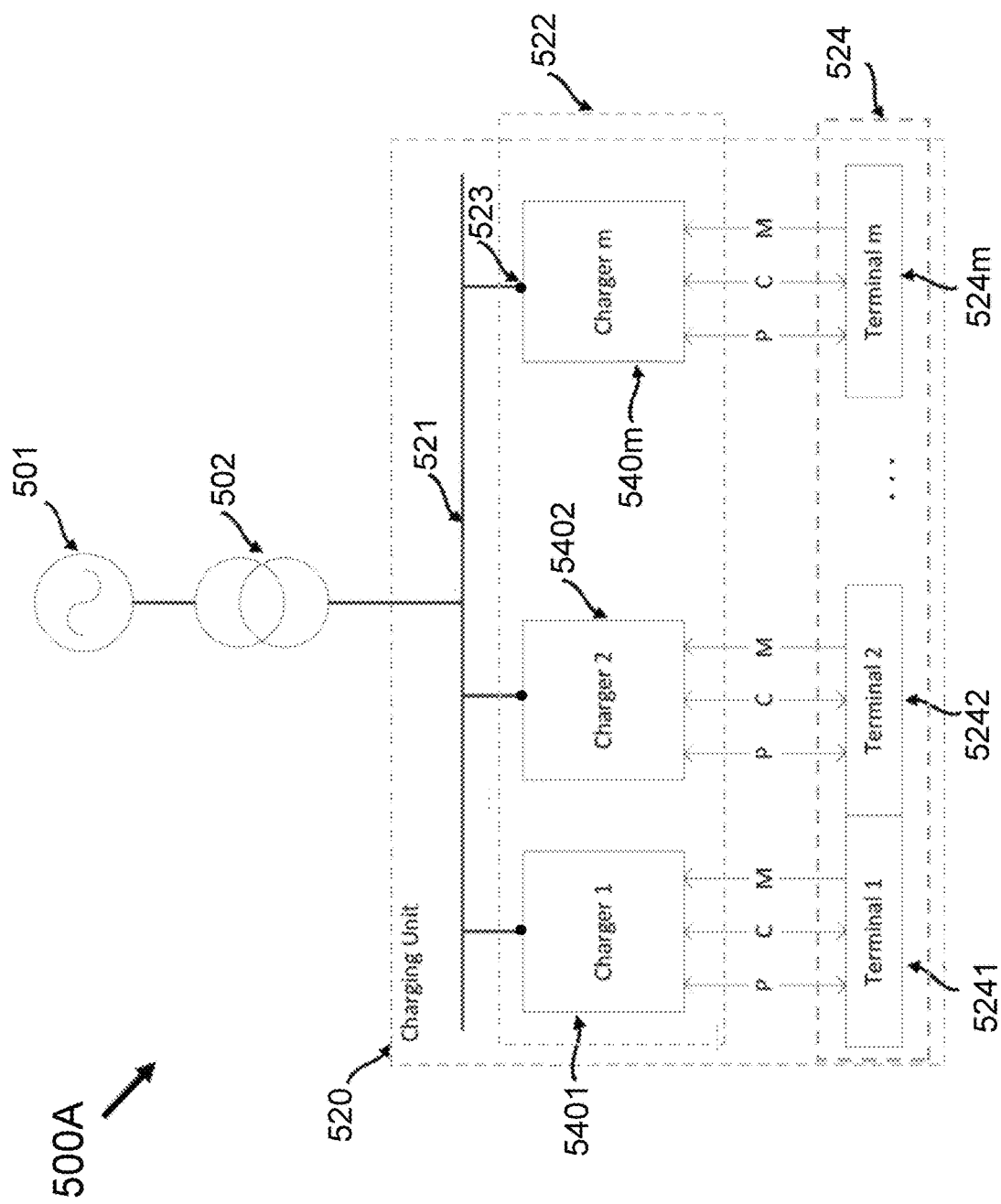
FIG. 5A illustrates a configuration for each of the plurality number of m chargers to transfer output power, exchange control signals and information via a terminal, according to certain embodiments of the present disclosure.
Figure 5B:
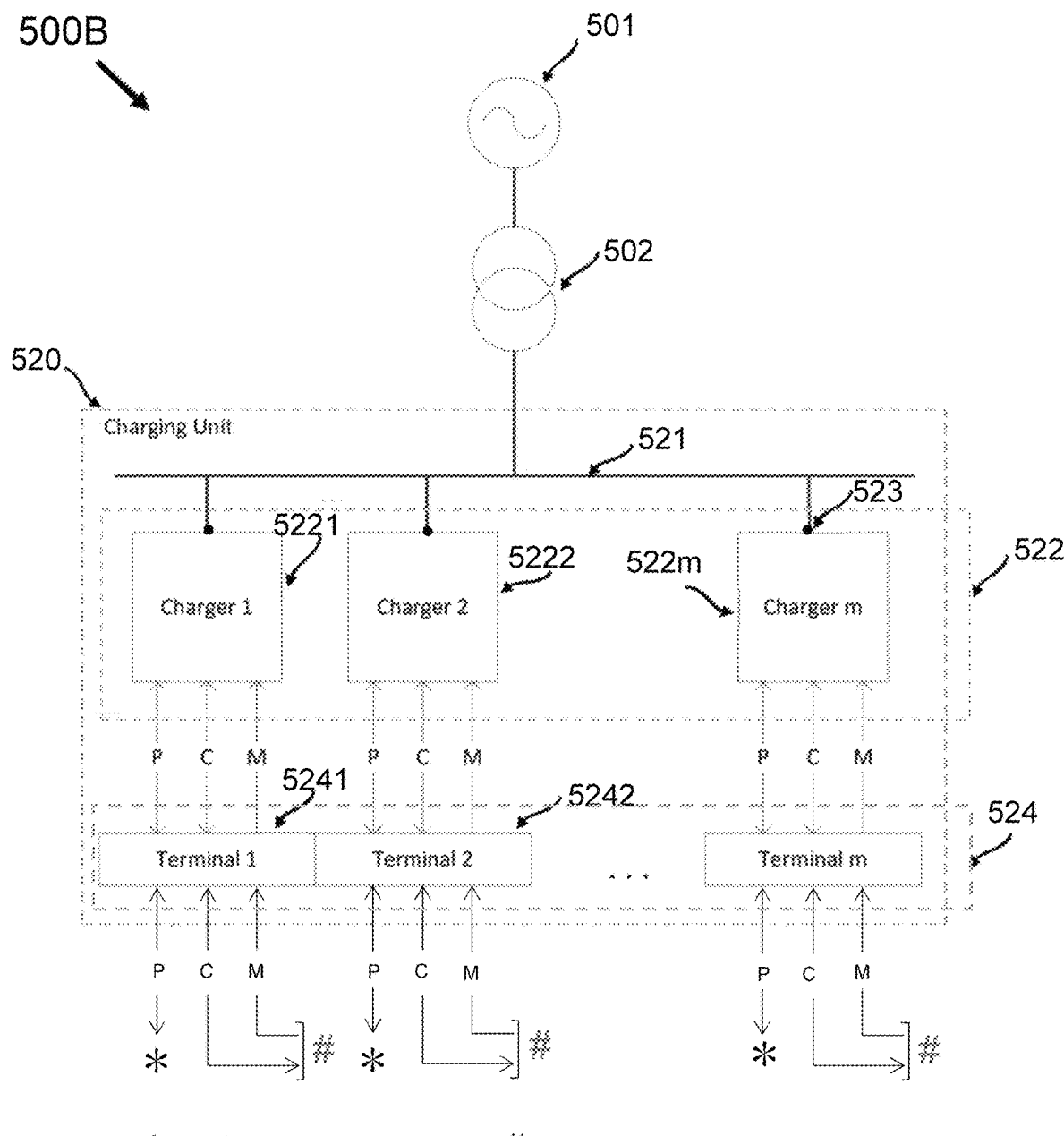
FIG. 5B illustrates alternative configurations under certain embodiments for transferring or exchanging control signals and information via a terminal, according to certain embodiments of the present disclosure.

FIG. 5 illustrates exemplary block diagrams of the charger unit 520 connected with a grid 501 according to embodiments of the present disclosure. In FIGS. 5A, 5B, the charger unit 520 according to certain embodiments includes: a common AC bus 521 configured to receive an AC voltage from the grid 501; a plurality of m chargers 522, each connected to the common AC bus 521 via an AC input port 523; and a plurality of m terminals 524 configured to connect each of the plurality of m chargers to other units. A distribution transformer 502 may be inserted between the grid 501 and the common AC bus 521 to step-down a grid voltage to the AC voltage receivable by the chargers. The common AC bus 521 may be AC low voltage or AC high voltage depending on specifications of the chargers.

Each of the plurality of m chargers 522 includes: power electronics circuits to convert the AC voltage received from the common AC bus 521 to DC voltage(s) for charging the battery of EV; and control modules to control a current or a voltage of the battery within predetermined ranges during charging. However, some of the plurality of m chargers may be configured to serve as standard AC outlets with low voltage (110-220 V).

In FIG. 5A, each of the plurality of m terminals 524 is configured to convey: a) DC or AC output power for charging to be transferred to the switching unit 430 and further to the interface unit 440 via a power connection line denoted by "P" in FIG. 5A; b) information on the charging status of the battery from the interface unit 440 via the switching unit 430 and/or via the control unit and control signals from the control unit 410 via a signal line denoted by "C" in FIG. 5A; and c) the mechanical safety signal from the mechanical shutter at the interface unit via the control unit and/or via the switching unit 430 via a signal line denoted by M in FIG. 4.

FIG. 5B illustrates alternative configurations according to certain embodiments for transferring or exchanging above information on the charging status of the battery from the interface unit 440 and the mechanical safety signal from the mechanical shutter without routing the switching unit 430, but via the control unit 420. An impact of this alternative option is described in below discussion on the switching unit 430.

Figure 6A:
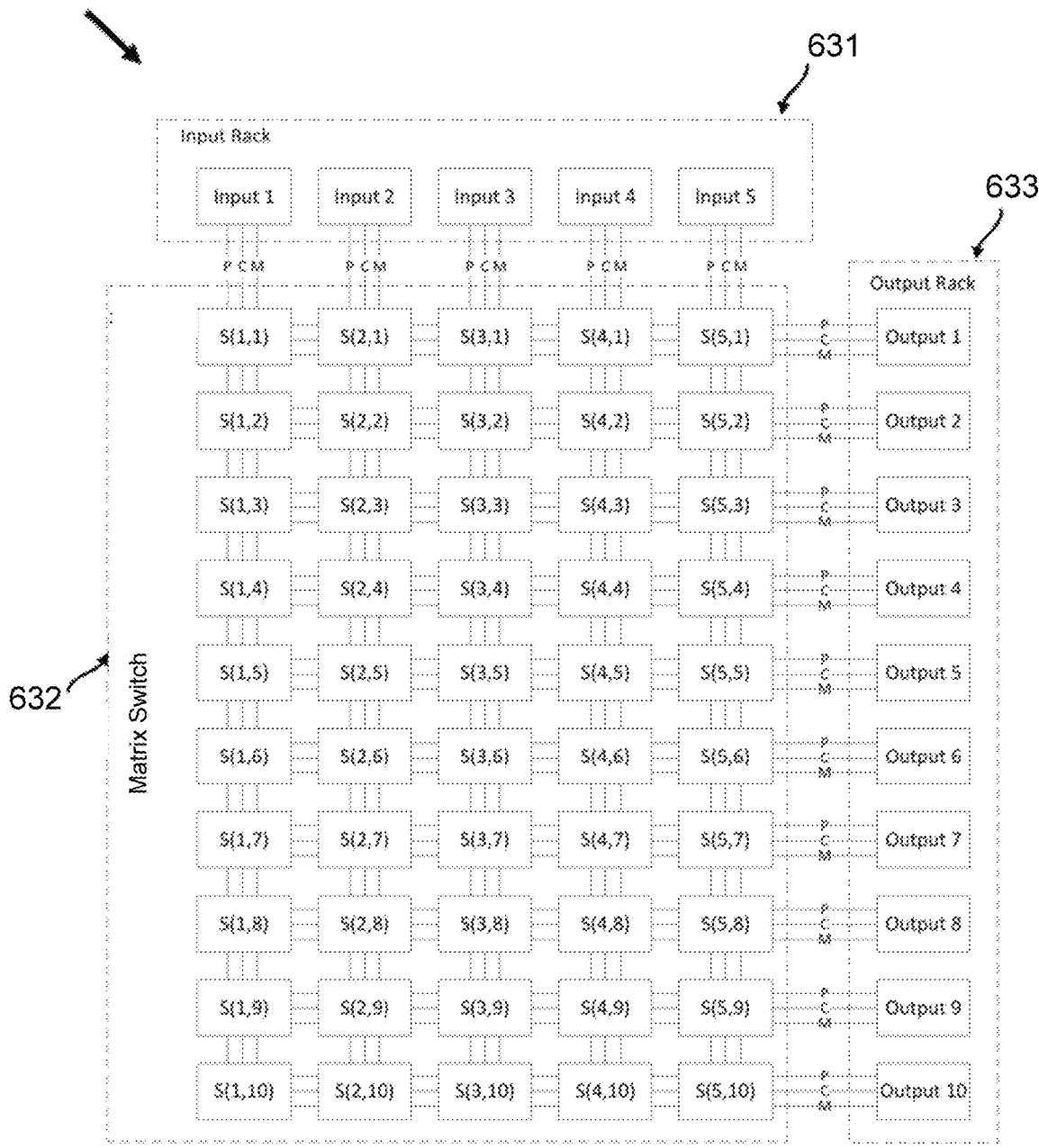
FIG. 6A illustrates the switching unit including an input rack, a matrix switch, and an output rack, according to certain embodiments of the present disclosure.
Figure 6B:
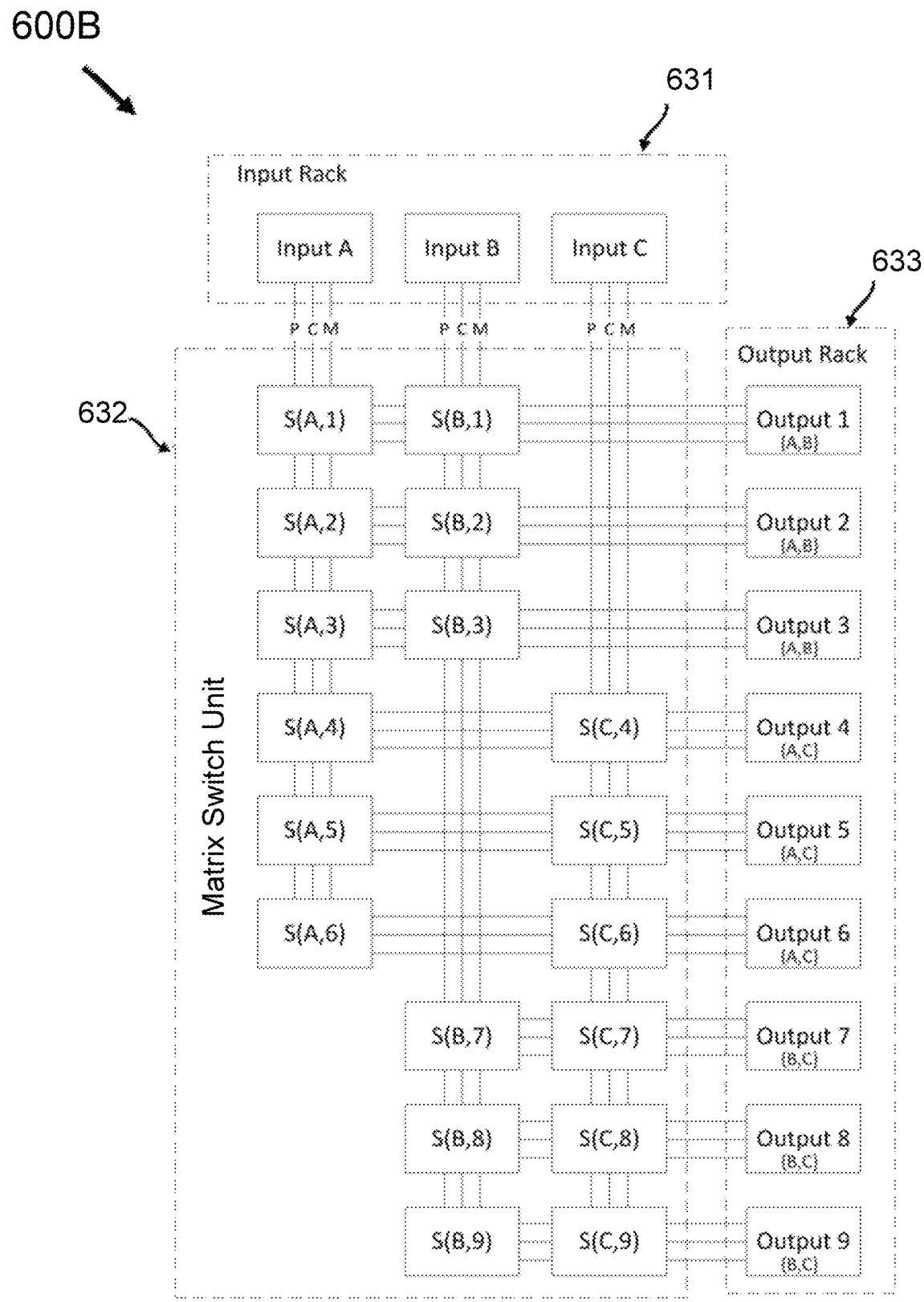
FIG. 6B illustrates an exemplary switching unit under certain embodiments for 66.67% access with 3 inputs and 9 outputs (m=3 and n=9), according to certain embodiments of the present disclosure.

FIGS. 6A and 6B illustrate typical structures of the switching units according to certain embodiments of the present disclosures. FIG. 6A illustrates the switching unit 600A including an input rack 631, a matrix switch S 632, and an output rack 633. The input rack 631 includes five input terminals (m=5), each connected to each of the terminals of the charger unit 420, and the output rack 633 includes ten output terminals (n=10) to the interface units. To realize efficient utilization of the chargers, the plurality number of the outputs n (=10) larger than the plurality number of the inputs m (=5) has been chosen and the 100% access has been assumed. Each of the input terminals of the input rack 631 is connected to each of the output terminals 524 of the plurality number of m charger unit 520, and is configured to accommodate a set of the charging power ("P"), information and control signals ("C") and the mechanical safety signal (M) detailed in FIG. 5 to be adoptable to various charger available in the market.

The matrix switch S 632 includes a matrix switch elements $S(i,j)$ (i=1, ..., m, j=1, ..., n), which is configured to connect any available charger "i" to any available interface port "j." The matrix switch element $S(i,j)$ is also called as crossbar switch, or a cross connect switch. The matrix switch S constituted by solid state electronics switches or with electronically driven mechanical switches are commercially available. See for example, "PRODUCT FLYER PXI Switch Modules" National Instruments, http://www.ni.com/pdf/product-flyers/pxi-switch-modules.pdf, and https://en.wikipedia.org/wiki/Crossbar_switch, entire contents of both are incorporated herein by reference. According to embodiments, the matrix switch S 632 includes three layers of the matrix switches $S_P(i,j)$, $S_C(i,j)$, and $S_M(i,j)$, all three are configured to operate in a same configuration of on/off states by a common control signal, while each configured to accommodate independently the charging power ("P") to be transferred to the interface units 440, the information and the control signals ("C") and the mechanical safety signal ("M"), respectively as detailed in FIG. 5 and illustrated in FIG. 6A.

The output rack 633 includes output terminals (n=10) each of which is connected to the plurality number of n interface ports (n=10) in the interface unit 440, respectively and configured to accommodate the set of the charging power ("P"), information and control signals ("C") and the mechanical safety signal (M) detailed in FIG. 5.

Alternatively, under certain embodiments, b) the information on the battery from the interface unit 440 and/or c) the mechanical safety signal from the mechanical shutter may be transmitted via the control unit 420 directly, namely bypassing the switching unit 430. In such configuration, the matrix switch S may include just one layer of matrix switch $S(i,j)$ which is configured to accommodate the charging power from the charger unit 420 to the interface unit 440.

FIG. 6B illustrates an exemplary switching unit under certain embodiments for 66.67% access with 3 inputs and 9 outputs (m=3 and n=9). Here, each of the outputs 633 can access only two of the three inputs. Namely, the outputs 1 to 3 are configured to be accessible to the chargers (inputs) A or B, the outputs 4 to 6 are to the chargers (inputs) A or C, the outputs 7 to 9 are to the chargers (inputs) B or C.

Figure 7:
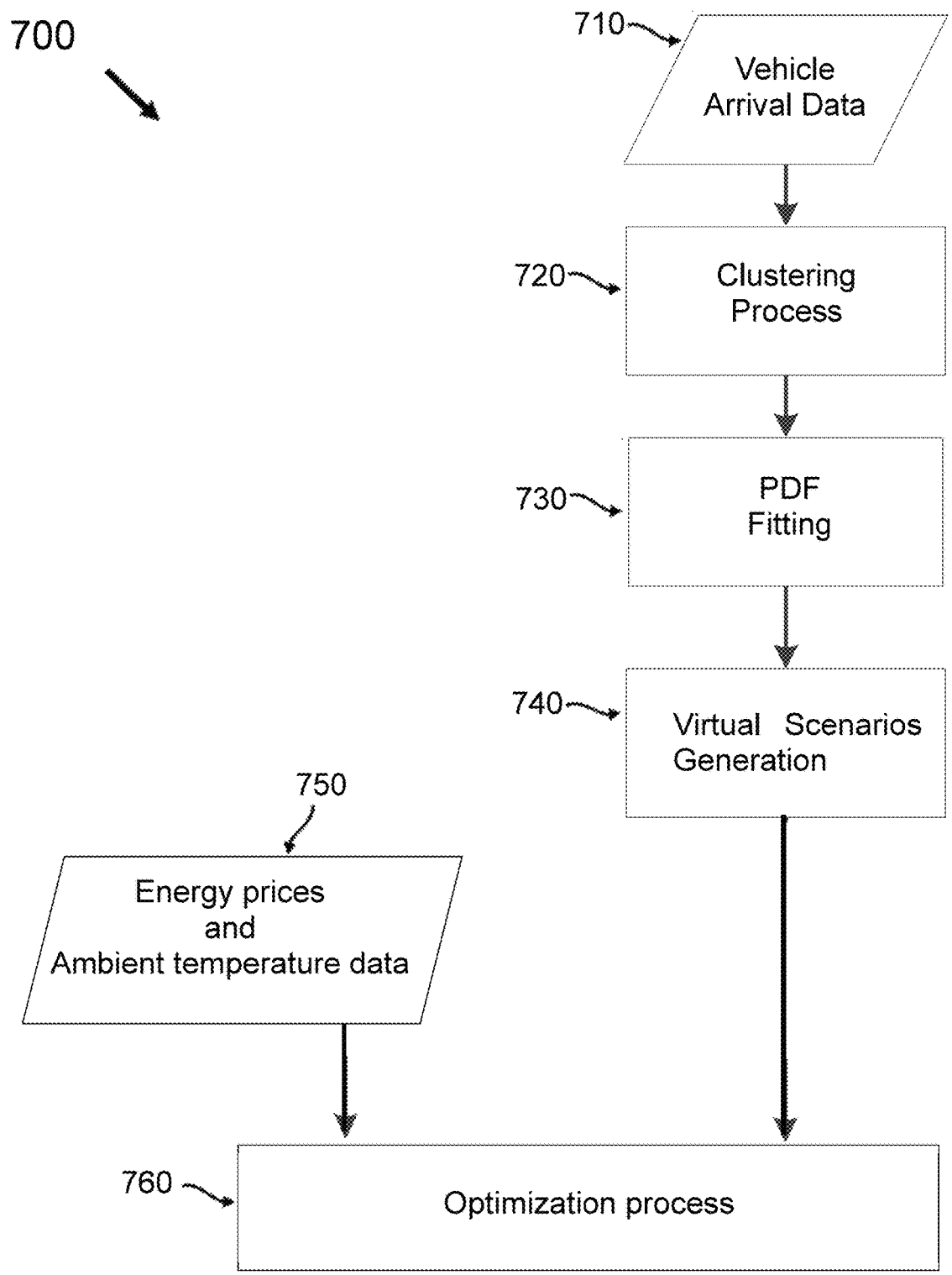
FIG. 7 is an exemplary flow chart of planning process determining the plurality number and capacities of chargers of the charging unit under certain embodiment of the present disclosures.

FIG. 7 is an exemplary flow chart of planning or designing process determining the plurality number and power ratings (capacities) of chargers of the charger unit under certain embodiments of the present disclosures. A major aspect in determining the number of chargers in a smart parking lot for charging EVs is that the EV demand is not fixed, and is dependent on the number of chargers. The smaller the number of deployed chargers, the more likely that the EV charging demand is going to be flat with the lower customer satisfaction. Because, it is infeasible to connect some of the outlets/interface ports to the chargers, which may lead to a longer waiting time or a lower throughput. A more significant number of chargers will result in higher flexibility, higher throughput and higher customer satisfaction. However, the cost of purchasing those chargers will be a limiting factor.

Thus, the method illustrated in FIG. 7 and described below introduces a probabilistic model for the EV charging process to formulate the EV charging demand and hence specifies the number and capacities of chargers to be deployed in the smart parking lot system charging with the EVCM under certain embodiments. Aspects taken into account include: time of the day (daytime or night), type of the day (weekend, weekday, or statutory holiday), month, and geographical location of the parking lot.

In the first step 710, collecting the vehicle arrival data for EVs in FIG. 7, historical data of arrival rates and parking durations for all vehicles is utilized in addition to a statistical adoption rate of EVs either of regional or state level. Since each type of parking lots (residential, commercial downtown, commercial commute, ..., etc.,) has different vehicle arrival rates and parking durations and so on, the historical vehicle data are collected from the parking lot where installation of the smart parking lot system with EVCM is planned or from a similar type. The charging energy in kWh and charging power (maximum) in kW are assumed to follow a standard uniform distribution between a minimum and a maximum. Those two values are chosen based on the available EVs in the market.

In the second step 720, clustering process, the historical data are clustered into 12 months, and each month data are clustered into two type of days: weekend or holiday as type 1 and weekday as type 2. Then, the arrival rates and the parking durations of the arriving vehicles in each of the interested (preferably 24) hours of the 24 month-type of days (12 months×2 type of days) representing the year are extracted from the historical data.

In the third step 730, PDF fitting process, different types of probability density functions (PDF) are used to simulate the arrival and the parking duration data. Several methods can be used to fit the historical data with the best PDF, such as the maximum likelihood method. Simulation results for a downtown parking lot showed that the arrival rates of the EVs follow a Gaussian distribution. However, another type of parking lot or the same type in another location may fit better with another type of PDF. The final outcome of this process is a value of one or two parameter(s), i.e., mean and variance of the PDF that best fit the historical data of the arrival rates for each of the interested hours (interested hours×24 days, preferably 576 hours-type of days representing the year. The same process is repeated for the parking durations.

In the fourth step 740, virtual scenario generation process, Monte Carlo Simulation (MCS) method is used to generate virtual scenarios of the arrival rates and parking durations. This method relies on using the inverse of the cumulative distribution function (CDF) describing every hour of the 576 hours representing the year to generate virtual scenarios of vehicles arrivals.

As an example of a CDF calculation, for a parking lot in downtown Toronto, Ontario, Canada [S. M. Kandil, H. E. Z. Farag, M. F. Shaaban, M. Z. El-Sharafy, "A combined resource allocation framework for PEVs charging stations, renewable energy resources and distributed energy storage systems", Energy, Volume 143, 2018, Pages 961-972, ISSN 0360-5442—incorporated here y reference], the arrival rate distribution from 9:00 AM to 10:00 AM follows a normal distribution with a mean ($\mu$) of 53.76 EV arrivals per hour and a standard deviation ($\sigma$) of 10.99 EV arrivals per hour.

The CDF of the normal distribution for the random variable x, which in this case represents the arrival rate, is given in (A). Assume the inverse of this CDF to be $F^{-1}$ (x), then, to generate virtual scenarios (S) of size N for the arrival rate, a set of size N of uniformly random distributed (U) numbers between 0 to 1 is used as in (B).

$$F(x) = \frac{1}{\sigma\sqrt{2\pi}} \int_{-\infty}^{x} e^{-\frac{1}{2}(\frac{x-\mu}{\sigma})^2} dx \quad (A)$$

$$S_i = F^{-1}(U_i) \; \forall \; i = 1, \ldots, N \quad (B)$$

The process of generating scenarios terminates when the convergence criterion is achieved. Due to the diversity of variables in the EV data: arrival rates, parking durations, charging energy, and charging rate limit, the number of virtual scenarios is huge (in the range of hundreds of thousands or millions), where each scenario has the same probability of occurrence. Therefore, a scenario reduction process is required to reduce the number of scenarios by combining similar scenarios. This will result in scenarios with different probabilities. The final number of scenarios is a trade-off between complexity of the next process and the accuracy of the results.

In the fifth step 750, energy prices and ambient temperatures data are generated with a similar probabilistic model of the arrival rates or by a simple average of the historical prices and temperatures for each of the 576 hours.

In the final step 760, optimization process, all operation aspects are considered, where identifying the number of chargers is performed to minimize the total capital and operational costs of the parking lot, which includes the profit of the parking lot owner, based on the expected EV annual charging demands.

The features of the optimization process 760 include:
i) A set of model for the EV charging process is implemented as a part of system constraints, which usually consists of a constant current charging, followed by a constant voltage charging;
ii) A satisfaction factor (SF) level for all EVs arriving to the parking lot is implemented as a constraint in the optimization process. This SF is defined as the ratio of the delivered energy and the required energy in kWh;
iii) The total EV demand is limited by the distribution transformer maximum thermal loading, which differs according to the ambient temperature;
iv) each EV visiting the parking lot is not assigned to one charger, as in conventional planning approaches. Each EV is assigned to an outlet, while the chargers are connected to these outlets in a schedule that achieves the best utilization of the optimal number of chargers to be installed in the parking lot. This model is the major modification in the planning algorithm to accommodate the EVCM.

Figure 8:
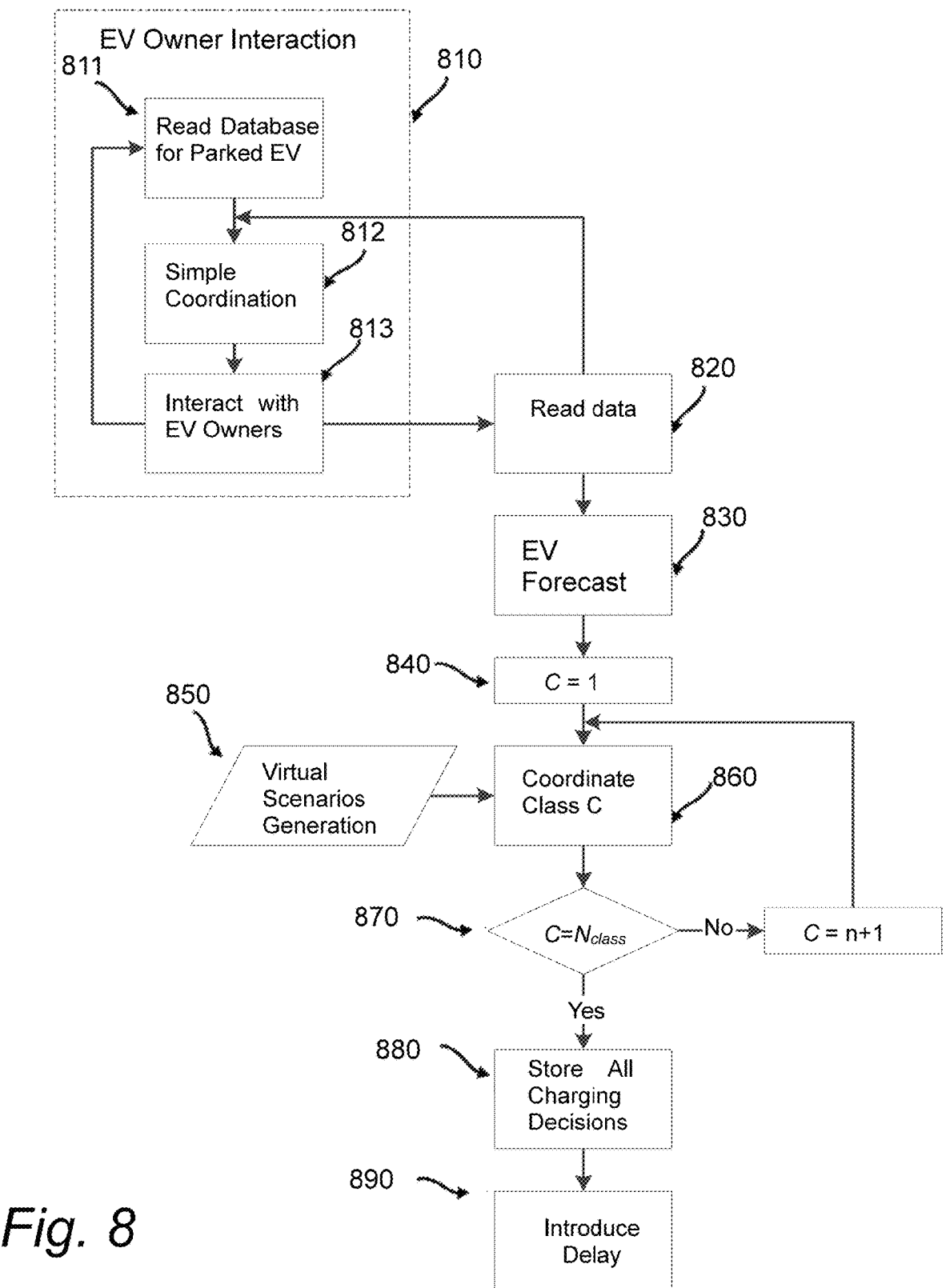
FIG. 8 is an exemplary flow chart for operational process of the smart EV charging lot according to certain embodiment of the present disclosure.

FIG. 8 is an exemplary flow chart for operational process of the smart EV charging lot under certain embodiments of the present disclosure. This part runs in real-time to best utilize the parking lot assets to satisfy the EV owners' requirements without violating the system constraints. Predictive coordination approach (PCA) is adopted for the EV charging in the parking lots. The PCA coordinates the EV charging in real-time while accounting for the regular loads (residential, commercial, and industrial) and the EV charging demands over a specific period in the future (a PCA time window), which is usually measured in a few hours. Two types of EVs are defined in the PCA. The first is an actual EV plugged in the parking lot, and the second is an EV that is expected (forecasted) to arrive to the parking lot during the PCA time window. The optimal charging decisions over the PCA time window are stored in the database and only the current time charging decisions are sent to the controller. All other charging decisions are tuned in real-time by using the EV's actual arrival data and charging demands to update both the plugged-in EV information and the forecasted EV information. The PCA is repeated every specific time step (tstep), which depends on the hardware speed, duration of the PCA time window, and the size of the parking lot. Thus, the time window of the PCA moves in real-time every time step (tstep), i.e., based on a sliding window. The details of the PCA are described below.

Upon arrival of an EV at the parking lot, EV owner interaction (step 810) starts: the owner plugs-in the EV and communicates with the control unit 410 to exchange the required information. This information includes the required SOC and vehicle departure time. This step 810 uses a simple coordination process to notify the EV owner with the maximum energy/SOC that can be delivered/achieved during the vehicle parking duration. The process is repeated as follows:
i) At step 811, the data of the current EV plugged in the parking lot is read from the database;
ii) At step 812, a simple coordination process is performed based only on the plugged in EVs in the parking lot and with the objective of maximizing the delivered energy to the EVs without considering the charging costs and without using any forecasted EV information;
iii) At step 813, a set of charging options are shown to the EV owner via the smart panel used as a customer interface (to transfer information from the parking lot operating system to the EV owner and vice versa). The EV owner is required to choose one from the charging classes which differ in charging priority and charging price per kWh.

Then, the EV owner input is transferred to the control unit 420 and the main PCA cycle starts at step 820 by reading the database tables corresponding to the EV owners' input data, currently plugged in EVs' charging status, and historical data of the EV charging demands and arrivals, where more recent data are used than the vehicle arrival data in the step 710.

The data collected at the step 820 is transferred to an EV forecast unit (830). The EV forecast unit 830 is responsible for forecasting the charging requirements over the near future (for the duration of the PCA time window) for the EVs arriving to the parking lot. The EV forecast unit 830 can adopt several methods to forecast the EV future charging requirements, including (but not limited to) artificial neural network (ANN). Most recent historical data are used to train the ANN for an hourly-regression forecast model of the future EV charging requirements (see for example Zhu, J.; Yang, Z.; Mourshed, M.; Guo, Y.; Zhou, Y.; Chang, Y.; Wei, Y.; Feng, S. Electric Vehicle Charging Load Forecasting: A Comparative Study of Deep Learning Approaches. *Energies* 2019, 12, 2692—incorporated herein by reference). Weather information and social events are also used as inputs to the forecasting model to accurately forecast the EV arrivals, EV owner behavior, and charging requirements in the parking lot. Moreover, the forecast model should assign the EV charging to different available charging classes, which depends on estimating the EV owner behaviors.

Then at the next step 840, a predefined number of charging classes "Nclass" are offered to the EV owner at the customer interface. Those classes are categorized by priorities, i.e., class 1 (c=1) has higher priority and consequently higher charging prices compared to class 2 (c=2). The step of coordination starts by offering the charging for the highest class and sequentially the lower classes. All required data are prepared and provided (step 850), for the step of coordination for each class, where the required data includes charging information for higher classes, weather information, energy prices, the EV forecast unit output, and current EV information.

The coordination process for class "c" (step 860) uses the charging decisions of higher classes as hard constraints, and the lower classes charging decisions are set as variables. The objective is to minimize the charging costs for class "c" only, without violating the system technical constraints. The coordination process utilizes a mixed-integer program (MIP) and is configured to develop the class "c" as an optimal charging decision. The major modification in the real-time coordination process is that the coordination process does not only control the charging rate of the chargers, as in conventional coordination methods. The coordination process optimally assigns the chargers to the outlets by enabling at most one switch per column and one switch per row in the matrix switch. The coordination process is repeated for each individual class until all classes "Nclass" charging decisions are optimized.

In step 880, all charging decisions of plugged-in EVs and forecasted EVs are stored in the database. Further (step 890), a delay is introduced until next run to ensure synchronized operation of the PCA every time step "tstep".

After starting charging to the EVs newly added, monitoring operation statuses of the plurality number of m chargers and the plurality number of n interface ports, and charging statuses of all EVs under charging process continues.

Further, estimating a best utilizing function for a present configuration of assignments of the plurality of m chargers to some of the plurality of n interface ports, and for possible other configurations are performed. Here, the best utilizing function is defined by a weighted sum of evaluation factors, where the evaluation factors includes an operation efficiency of the chargers, a total profit from the system expected per hour or per day, and a customer satisfaction factor including a ratio of the delivered energy and the required energy. The weighting coefficients are specified by an operator depending on management policy. Estimated results are compared and a decision is made whether any change to an another configuration of assignments should be made.

Then, when the decision required a change of the configuration, modifying the configuration of the assignments is executed. The above steps are repeatedly performed.

According to certain embodiments of the present disclosures, the smart parking lot system for EV charging is customized based on grid connection capacity, parking lot capacity, and budget. The new EVCM adopting a matrix switch or a cross connect mechanism presents a breakthrough in multiple EV charging mechanisms. Moreover, the invention can be implemented with different charger capacities or even different manufacturers. Instead of enclosing each charger and charging outlet in one unit, all the parking lot chargers are located in one unit and connected to the interface ports via the switch unit, which is composed of either mechanical matrix switches or power electronic matrix switches.

The proposed architecture permits reconfiguration of the plurality of n parking slots is assigned to which of available chargers from the plurality of the m chargers, where m<n, by utilizing reconfiguration of assignment realized by the matrix switch controlled by a controller.

The proposed EVCM has several advantages, which include and are not limited to:

1) It will significantly reduce the cost of the required hardware for multiple EV charging in parking lots;

2) EVs that reach full charge will no more hold a charger even during the rest of their parking time;

3) The system allows the use of smart energy management techniques for EV charging management;

4) The system can combine different charger manufacturers and different charger capacities, where each charger can be connected to any parking slots via the reconfigurable matrix switch. Thus, an EV connected to a higher power rating charger and with almost full battery can be transferred to a lower power rating charger, while another EV can use the higher power rating charger, by changing the configuration of the matrix switch and without changing their parking slots. This flexible operation will dramatically enhance charging coordination efficiency;

5) It allows expansion of the parking lot for future needs with minimal cost.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A smart parking lot system for charging electric vehicles (EVs), the smart parking lot system comprising:
  a charger unit comprising a plurality of m chargers, each thereof is configured to output an output power for charging via a terminal, the terminal further comprising a P-port configured to link the output power,
  a switching unit comprising a matrix switch $S_P$ with matrix switch elements $S_P(i,j)$, a plurality of m input ports; and a plurality number of n output ports, wherein the matrix switch elements $S_P(i,j)$ are configured to switch a connection between an i-th input port and a j-th output port according to a control signal specifying an address (i,j) and a switching state, and
    each of the plurality of m input ports of the matrix switch $S_P$ is connected with one of the P-ports of the plurality of m chargers, respectively,
  an interface unit comprising a plurality of n interface ports, each thereof to be installed at one of a plurality of n parking slots, respectively, and
  an EV charging outlet to be attached to an EV parked for charging; a monitor of the battery of the EV; and a smart panel as an interface with a customer, wherein the EV charging outlet further comprising the P-port configured to link the output power from one of the plurality of m chargers to the battery of the EV, each the plurality of n interface ports is connected to one of the plurality of n output ports of the matrix switch $S_P$ via the P-port of the EV charging outlet, respectively, a control unit comprising: a processor; and a memory, the control unit is configured to control operations of the smart parking lot system via control signals based on information on the EV and a request from the customer, and according to system operation programs, a database and system constraints preinstalled in the memory, wherein the switching unit is configured to provide for one of the plurality of n interface ports accessibilities to at least two chargers, and the controller is configured to provide for the EV connected with the one of the plurality of n interface ports accessibilities to the at least two chargers when available, each of the EV charging outlets comprises a mechanical shutter for safety, the mechanical shutter is configured to secure that a charging cord is completely plugged in the vehicle, and to send a mechanical shutter activation signal to the control unit by a wireless network or by the wired signal line connecting the control unit and the interface unit; and the mechanical shutter is further configured to send the mechanical shutter activation signal by a wired line and via the switching unit to the charger connected, wherein, the switching unit is further comprising a second layer matrix switch $S_M$ for connecting the mechanical shutter and the charger, wherein the second layer matrix switch $S_M$ is comprising the matrix switch elements $S_M(i,j)$ configured to operate in the same configuration as of the matrix switch $S_P(i,j)$, driven by the same control signal as for the matrix switch $S_P$, the EV charging outlet of one of the plurality of n interface ports comprises a M-port of the EV charging outlet, wherein the M-port is configured to link the mechanical shutter activation signal to one of the plurality of n output ports of the second layer matrix switch $S_M$, in connection with the matrix switch $S_P$, the terminal of one of the plurality of m chargers further comprises a M-port of the terminal, wherein the M-port is configured to link the mechanical shutter activation signal from one of the plurality of m input ports of the second layer matrix switch $S_M$ to the charger, in connection with the matrix switch $S_P$.

2. The smart parking lot system of the claim 1, wherein output power levels of the plurality of m chargers comprising at least two different power levels;

the switching unit is configured to provide for one of the plurality of n interface ports accessibilities to at least two chargers with different output power levels, and the control unit is configured to provide for an EV already connected to the one of the plurality of n interface ports and started charging by one of the at least two chargers with different power levels, a switching to a new connection to another one of the at least two chargers with different power levels, by reconfiguring switching states of the matrix switch $S_P$, when the another one of the at least two chargers with different power levels is available and when the controller decides the switching necessary, wherein the different power levels comprising Level 2 and Level 3.

3. The smart parking lot system of the claim 1, wherein the matrix switch is further configured to provide for one of the plurality of n interface ports accessibilities to any of the plurality of m chargers.

4. The smart parking lot system of the claim 1, wherein the monitor is further configured to send the information on the battery by a wired line and via the matrix switch to the charger connected, wherein, the switching unit is further comprising a third layer matrix switch $S_C$ for connecting the monitor and the charger, wherein the third layer matrix switch $S_C$ is comprising the matrix switch elements $S_C(i,j)$ configured to operate in the same configuration as of $S_P(i,j)$, driven by the same control signal as for the matrix switch $S_P$, the EV charging outlet of one of the plurality of n interface ports comprises a C-port of the EV charging outlet, the C-port is configured to link the information from the monitor to one of the plurality of n output ports of the third layer matrix switch $S_C$, in a connection consistent with the P-port, the terminal of one of the plurality of m chargers is further comprising a C-port of the terminal, the C-port is configured to link the information from the monitor via one of the plurality number of m input ports of the third layer matrix switch $S_C$ to the charger, in a connection consistent with the P-port.

5. The smart parking lot system of the claim 1 further comprising a manual switch unit for operation of the smart parking lot system in case of a failure of the control unit, wherein the manual switch unit is configured to select a plurality number of k chargers, wherein k is not greater than m, and to assign each of the k chargers to one of the plurality number of n interface ports, respectively.

6. The smart parking lot system of the claim 1, wherein the matrix switch element is constituted by either a semiconductor switch or a mechanical switch.

7. The smart parking lot of the claim 1, wherein the system is configured to operate in a mode of buying a predetermined amount of electric power from the battery of the EV connected to one of the plurality of n interface ports, via a charger connected with the EV.

8. A smart parking lot for charging electric vehicles (EVs), comprising, a charger unit comprising a plurality of m chargers, each thereof is configured to output an output power for charging via a terminal, the terminal further comprising a P-port configured to link the output power, a switching unit comprising a matrix switch $S_P$ with matrix switch elements $S_P(i,j)$, a plurality of m input ports; and a plurality number of n output ports, wherein the matrix switch elements $S_P(i,j)$ are configured to switch a connection between an i-th input port and a j-th output port according to a control signal specifying an address (i,j) and a switching state, and each of the plurality of m input ports of the matrix switch $S_P$ is connected with one of the P-ports of the plurality of m chargers, respectively, an interface unit comprising a plurality of n interface ports, each thereof to be installed at one of a plurality of n parking slots, respectively, and an EV charging outlet to be attached to an EV parked for charging; a monitor of the battery of the EV; and a smart panel as an interface with a customer, wherein the EV charging outlet further comprising the P-port configured to link the output power from one of the plurality of m chargers to the battery of the EV, each the plurality of n interface ports is connected to one of the plurality of n output ports of the matrix switch $S_P$ via the P-port of the EV charging outlet, respectively, a control unit comprising: a processor; and a memory, wherein the control unit is configured to control operations of the smart parking lot system via control signals based on information on the EV and a request from the customer, and according to system operation programs, a database and system constraints preinstalled in the memory, wherein the switching unit is configured to provide for one of the plurality of n interface ports accessibilities to at least two chargers, and the controller is configured to provide for the EV connected with the one of the plurality of n interface ports accessibilities to the at least two chargers when available, wherein the database is comprising a historical data on vehicle arrival rate and durations, charging energy, the data base is specifically prepared for the smart parking lot system, wherein the controller is configured to update the database in each arrival or periodically, the system operation programs are comprising:
 a program estimating a best utilizing function defined by a weighted sum of evaluation factors, the evaluation factors comprising: an operation efficiency of the chargers; a total profit from the system; and a customer satisfaction factor comprising a ratio of the delivered energy and the required energy, wherein weighting coefficients are configured to be specified by an operator; and
 a program estimating each of the evaluation factors, and the system constraints are comprising:
 the controller controls the operations within a power limit of the grid power;
 the controller adopts an EV charging process according to a set of models for the EV charging process, the set of models for the EV charging process comprising: a constant current charging; and a constant voltage charging; and
 the controller estimates the best utilizing function for present and other possible configurations of the assignments of the plurality number of m chargers to some of the plurality number of n interface ports, at present or in near future, and decides a next step configuration to be adopted and a timing to modify the configuration.

9. A method for designing a smart parking lot system for charging EVs, the smart parking lot system for charging EVs comprising:

a charger unit comprising a plurality of m chargers, each thereof is configured to output an output power for charging via a terminal;

a switching unit comprising a matrix switch S with the plurality of m input ports; and a plurality of n output ports, wherein the matrix switch elements $S(i,j)$ is configured to switch a connection between an i-th input port and a j-th output port according to a control signal specifying an address (i,j) and a switching state, and each of the plurality of m input ports of the matrix switch S is connected to one of the plurality of m chargers via the terminal, respectively, an interface unit comprising a plurality of n interface ports, each thereof to be installed at one of the plurality of n parking slots, respectively, and is further comprising:

an EV charging outlet to be attached to an EV parked for charging; a monitor of the battery of the EV; and a smart panel as an interface with a customer, wherein the EV charging outlet further comprising a P-port configured to link the output power from one of the plurality of m chargers to the battery of the EV;

and a smart panel as an interface with a customer, wherein each of the plurality of n interface ports is connected to one of the plurality of n output ports of the matrix switch S via the P-port of the EV charging outlet, respectively, a control unit comprising: a processor; and a memory, the control unit is configured to control operations of the smart parking lot system via control signals based on an information on the EV and a request from the customer, and according to system operation programs, a database and system constraints preinstalled in the memory, wherein the switching unit is configured to provide for one of the plurality of n interface ports accessibilities to at least two chargers, and the controller is configured to provide for the EV connected with the one of the plurality of n interface ports accessibilities to the at least two chargers when available, and wherein, the method comprising:

collecting historical data on vehicle arrivals and demands for a location the smart parking lot system is planned to be built, the historical data on vehicle arrivals and demands comprising vehicle arrival rates, parking durations, charging energies (KWh) and charging rates (KW);

clustering the historical vehicle arrival data by two type of days, the two type of days classified by factors of weekday, weekend/holiday, and what month of year;

fitting distributions for clustered historical data for each of 24 days;

generating virtual scenarios for future vehicle arrival rates and the durations for each of the 24 days;

collecting historical data on energy prices and ambient temperatures for the 24 days;

optimizing specifications on the smart parking lot system for best utilization within a given constraint, the specification comprising the plurality of chargers m; power levels for each; and the plurality of the interface ports n.

10. The method of the claim 9, wherein the historical data on vehicle arrivals further comprising hourly dependencies for hours of days specified, the clustering comprising clustering the historical data by the hours of the 24 days, and the fitting distributions comprising fitting for clustered historical data for each of the hours of the 24 days, the generating virtual scenarios comprising generating virtual scenarios for future vehicle arrival rates and the durations for each of the hours of the 24 days;

the collecting historical data on energy prices and ambient temperatures comprising collecting the data for each of the hours of the 24 days.

11. The method of the claim 9, wherein
the step of fitting distributions comprises using different types of probability density functions.

12. The method of the claim 9, wherein
the step of generating virtual scenario comprises using Monte Carlo Simulation method.

13. The method of the claim 9, wherein
the step of optimizing specifications comprises:
developing a set of models for EV charging process as a part of the system constraints, the set of models for the EV charging process comprising: a constant current charging; and a constant voltage charging; and
maximizing a best utilizing function defined by a weighted sum of evaluation factors, the evaluation factors comprising: an operation efficiency of the chargers; a total profit from the system; and a customer satisfaction factor comprising a ratio of the delivered energy and the required energy, wherein weighting coefficients are configured to be specified by an operator.

\* \* \* \* \*